(12) United States Patent
Goss et al.

(10) Patent No.: US 7,322,032 B1
(45) Date of Patent: Jan. 22, 2008

(54) METHODS AND APPARATUS FOR SCHEDULING OPERATION OF A DATA SOURCE

(75) Inventors: Gregory S. Goss, Dunstable, MA (US); Albert A. Slane, Nashua, NH (US); Christopher J. Kappler, Waltham, MA (US)

(73) Assignee: Cisco Technology, Inc., San Jose, CA (US)

( * ) Notice: Subject to any disclaimer, the term of this patent is extended or adjusted under 35 U.S.C. 154(b) by 989 days.

(21) Appl. No.: 10/446,981

(22) Filed: May 28, 2003

(51) Int. Cl.
*G06F 9/46* (2006.01)
*G06F 9/30* (2006.01)
*G06F 7/38* (2006.01)
*G06F 7/42* (2006.01)
*G06F 7/50* (2006.01)
*G01R 31/08* (2006.01)

(52) U.S. Cl. .................. 718/102; 718/100; 712/200; 708/235; 708/505; 708/670; 708/671; 370/218

(58) Field of Classification Search ............... 718/100, 718/102; 712/200; 708/235, 505, 670, 671; 370/218
See application file for complete search history.

(56) References Cited

U.S. PATENT DOCUMENTS

| | | | |
|---|---|---|---|
| 5,555,405 A | 9/1996 | Griesmer et al. | 707/205 |
| 6,628,610 B1 | 9/2003 | Waclawsky et al. | 370/229 |
| 6,643,260 B1 | 11/2003 | Kloth et al. | 370/235 |
| 6,687,247 B1 | 2/2004 | Wilford et al. | 370/392 |
| 6,724,721 B1 | 4/2004 | Cheriton | 370/229 |
| 6,798,746 B1 | 9/2004 | Kloth et al. | 370/235 |
| 6,876,952 B1 * | 4/2005 | Kappler et al. | 702/187 |
| 6,891,834 B1 | 5/2005 | Dally et al. | 370/395.4 |
| 2003/0231630 A1 * | 12/2003 | Messenger | 370/392 |

OTHER PUBLICATIONS

Petrie, Michael C., Kuehner, Nathanael P., and Lupa, Piotr K. "Astro Simulcast System Throughput Optimization via Launch Time Offset Auto Calibration", Mar. 18, 2002, Motorola, Inc., IP.com Prior Art Database, pp. 1-2.*
U.S. Appl. No. 10/446,597, filed May 28, 2003, entitled "Methods and Apparatus for Scheduling Tasks".

* cited by examiner

*Primary Examiner*—Meng-Al T. An
*Assistant Examiner*—Kenneth Tang
(74) *Attorney, Agent, or Firm*—BainwoodHuang (57) ABSTRACT

A computerized device has dynamically modifiable hardware, such as an ASIC, that performs queue-scheduling operations. The hardware incorporates a generic sorting processor (GSP) that is dynamically configurable to implement various sorting algorithms to meet specific queue scheduling requirements for the computerized device. The computerized device extracts a first time stamp value and a second time stamp value associated with a first queue and a second queue, respectively. The computerized device receives instructions to configure a table of the GSP with scheduling entries. The computerized device compares the first time stamp value with the second time stamp value to form a comparison result. The computerized device then selects a decision instruction from the table, based upon the comparison result, and identifies a preferred queue of the first queue and the second queue, based upon the decision instruction.

19 Claims, 5 Drawing Sheets

METHODS AND APPARATUS FOR SCHEDULING OPERATION OF A DATA SOURCE

RELATED APPLICATIONS

This application relates to U.S. application Ser. No. 10/446,597 entitled "Methods And Apparatus For Scheduling Tasks", filed even date herewith, the contents of which are, herein, incorporated by reference in their entirety.

BACKGROUND OF THE INVENTION

Data communications networks provide for an exchange of data packets (e.g., network traffic) among computerized devices within the communications network. Such communications networks typically utilize computerized devices, such as data communications devices, to schedule transmission of particular packets over particular channels in a fair and pre-determined manner. Conventional data communications devices typically include multiple queues that receive and store data (e.g., packets) from different sources, each packet awaiting departure from each queue to a destination. The data communications devices are conventionally configured with queue schedulers or queue sorters to determine the order (e.g., the service order) of the operation of the queues.

For example, certain conventional data communication devices are configured with scheduling instructions or scheduling algorithms, such as implemented via software. Typically, scheduling requirements for a data communications device are dynamic and frequently change. As computer systems and communications networks become more complex in order to support many different and distinct traffic types, for example, the traffic scheduling requirements change. In the case where the data communications devices are configured with scheduling instructions or scheduling algorithms, implemented via software, an operator can change the scheduling algorithms, as needed, to conform the scheduling instructions to the requirements of the data communications device. For example, the operator can replace an existing scheduling algorithm if the scheduling algorithm becomes obsolete and is upgraded to a newer or more efficient algorithm or if the results of the existing scheduling algorithm prove to be inadequate (e.g., inefficient).

In another example, certain conventional data communication devices are configured with hardware, such as Application Specific Integrated Circuits (ASICs), that determine the order, or schedule, of the operation of the queues. Certain data communication devices have a relatively large number of queues waiting to transmit packets at relatively high rates over a large number of channels. A hardware implementation for queue operation scheduling provides relatively high-speed responsiveness and performance in the associated data communication device.

SUMMARY

Conventional techniques and mechanisms that provide for scheduling of queue operation suffer from a variety of deficiencies.

As described above, certain conventional data communication devices are configured with scheduling instructions or scheduling algorithms implemented via software. Such a configuration allows a user to modify or replace the scheduling algorithms to modify the queue scheduling operations of the data communications device (e.g., such as in the case where the algorithm is replaced by a more efficient algorithm). Certain high-speed systems or data communication devices have a large number of queues waiting to transmit packets at relatively high rates over a large number of channels. Software control of such data communication devices, however, struggles to achieve the relatively high-speed or high bandwidth capability of the devices because of limitations of processor speeds, bus speeds, memory device access speed, and competition for computer resources (e.g., bus contention), for example. By configuring such high-speed systems with scheduling instructions or scheduling algorithms implemented via software, therefore, the data communications device, in such a case, cannot achieve certain high-speed performance targets.

Also as described above, certain conventional data communication devices are configured with hardware, such as Application Specific Integrated Circuits (ASICs), that determine the order of operation (e.g., or scheduling) of the queues. Such a hardware implementation provides relatively high-speed responsiveness and performance (e.g., because of the relatively wide memory read and tree organization of the ASIC) with respect to queue order scheduling. Conventional hardware implementations, however, are configured to provide a relatively inflexible scheduling scheme. For example, in a case where a particular queue order scheduling hardware implementation proves to be inadequate (e.g., inefficient) over time, a user must replace the hardware with upgraded hardware in order to upgrade the scheduling scheme (e.g., in order to make the scheduling conform to a particular need of the associated data communications device). Such replacement is not easily performed by the end user and, therefore, is costly and time consuming to the end user.

By contrast, embodiments of the present invention significantly overcome such deficiencies and provide mechanisms and techniques for scheduling queue operations for multiple queues. A computerized device has dynamically modifiable hardware, such as an ASIC, that performs queue-scheduling operations. The hardware incorporates a generic sorting processor (GSP) that is dynamically changeable and configurable to implement various sorting algorithms to meet specific queue scheduling requirements for the computerized device. Sorting algorithms are relatively complex and change over time. The GSP, therefore, allows modification to the queue sorting functionality of the computerized device without replacement of the ASIC associated with the computerized device. The hardware (e.g., ASIC), therefore, provides relatively high-speed responsiveness and performance with respect to scheduling queue operations and is software configurable (e.g., via the GSP) to allow for changes or reconfiguration of the scheduling or sorting algorithms (e.g., software) for queue scheduling requirements.

In one arrangement, the invention relates to a method for scheduling operation of a preferred operand source associated with a computerized or electronic device. In the method, the computerized device configured with a lookup table having a plurality of scheduling entries receives a first operand from a first operand source and receives a second operand from a second operand source. The computerized device compares the first operand from the first operand source with the second operand from the second operand source to form a comparison result. The computerized device selects a decision instruction from the lookup table based upon the comparison result and identifies a preferred operand source of the first operand source and the second operand source based upon the decision instruction. Such an arrangement allows selection of the preferred operand source in a relatively fast manner, via the hardware (e.g., ASIC's) of the computerized device. Also, the configuration instructions (e.g., software) implement the scheduling of operation of the preferred operand source. In the case where the results of the configuration instructions are inadequate (e.g., scheduling operation is inefficient), a user can change or modify the configuration instructions to enhance the scheduling process. Use of the configuration instructions, therefore, provide flexibility in the scheduling process.

In one arrangement, prior to comparing, the computerized device aligns a first relevant bit of the first operand with a first relevant bit of the second operand. Such alignment or shifting of the operands helps to minimize the effects of "wrap around" during comparison of the first operand and the second operand. The alignment also normalizes the values of the first operand and the second operand in order to provide consistent comparisons between operands of different sized (e.g., differences in the number of bits forming the operands).

In one arrangement, when comparing, the computerized device subtracts one of the first operand and the second operand from the other of the first operand and the second operand. The computerized device performs such subtraction in a math processor or subtractor (e.g., hardware device), thereby providing relatively high-speed responsiveness and performance during the scheduling process.

In one arrangement, the computerized device forms an address based upon the comparison result where the address identifies a decision instruction in the lookup table. The address provides access to the lookup table, configured by the instructions received by the computerized device. Use of the address in conjunction with the lookup table allows the computerized device to access the dynamically changeable lookup table and, thereby, provides flexibility to the computerized device in scheduling operation of a preferred operand source or queue.

In one arrangement, when receiving a first operand the computerized device extracts a first time stamp value from a first key associated with the first operand source, and when receiving a second operand the computerized device extracts a second time stamp value from a second key associated with the second operand source. The computerized device compares the first time stamp value with the second time stamp value to form a first comparison result.

In one arrangement, when extracting the first time stamp value the computerized device extract a time stamp value field from the first key, the first key having a plurality of time stamp value fields and when extracting a second time stamp value the computerized device extracts a time stamp value field from the second key, the second key having a plurality of time stamp value fields. When comparing, the computerized device compares the time stamp value field from the first key with the time stamp value field from the second key to form a first field comparison result. The computerized device repeats the steps of extracting a time stamp value field from the first key, extracting a time stamp value field from the second key, and comparing the time stamp value field from the first key with the time stamp value field from the second key to form a second field comparison result. Such an extraction and comparison process allows the computerized device to compare subfields (e.g., separate time stamps) within an operand field, for relatively large operand fields (e.g., operands 64 bits in size).

In one arrangement, the computerized device aligns a first relevant bit of the first time stamp value with a first relevant bit of the second time stamp value. Such alignment or shifting of the time stamp values normalizes the first time stamp value and the second time stamp value in order to provide consistent comparisons between time stamp values of different sizes (e.g., differences in the number of bits forming the time stamp values).

In one arrangement, the computerized device receives a time value and, when comparing, subtracts one of the first time stamp value and the time value from the other of the first time stamp value and the time value to form a second comparison result and subtracts one of the second time stamp value and the time value from the other of the second time stamp value and the time value to form a third comparison result. Such a comparison allows the computerized device to process high bandwidth data flows.

In one arrangement, the computerized device forms an address based upon the first comparison result, the second comparison result, and the third comparison result where the address identifies a decision instruction in the lookup table. The address provides access to the lookup table, configured by the instructions received by the computerized device. Use of the address in conjunction with the lookup table allows the computerized device to access the dynamically changeable lookup table and, thereby, provides flexibility to the computerized device in scheduling operation of a preferred operand source or queue.

Another embodiment of the invention relates to a computerized device having at least one communications interface, a controller, such as a memory and a processor, for example, and an interconnection mechanism coupling the at least one communications interface and the controller. The controller is configured to receive, through at least one communications interface, a first operand from a first operand source, receive, through at least one communications interface, a second operand from a second operand source, and receive, through at least one communications interface, instructions to configure a lookup table with a plurality of scheduling entries, the lookup table associated with the computerized device. The controller is further configured to compare the first operand from the first operand source with the second operand from the second operand source to form a comparison result, select a decision instruction from the lookup table based upon the comparison result, and identify a preferred operand source of the first operand source and the second operand source based upon the decision instruction.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a controller such as a memory (e.g., any type of computer readable medium, storage or memory system) and a processor, and an interconnection mechanism connecting the communications interface and the controller. In such embodiments, the memory system is encoded with a scheduling application that when performed on the processor, produces a scheduling process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

The embodiments of the invention may be implemented by computer hardware mechanisms within a computerized device apparatus. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

A computerized device has dynamically modifiable hardware, such as an ASIC, that performs queue-scheduling operations. The hardware incorporates a generic sorting processor (GSP) that is dynamically changeable and configurable to implement various sorting algorithms to meet specific queue scheduling requirements for the computerized device. Sorting algorithms are relatively complex and change over time. The GSP, therefore, allows modification to the queue sorting functionality of the computerized device without replacement of the ASIC associated with the computerized device. The hardware (e.g., ASIC), therefore, provides relatively high-speed responsiveness and performance with respect to scheduling queue operations and is software configurable (e.g., via the GSP) to allow for changes or reconfiguration of the scheduling or sorting algorithms (e.g., software) for queue scheduling requirements.

Figure 1:
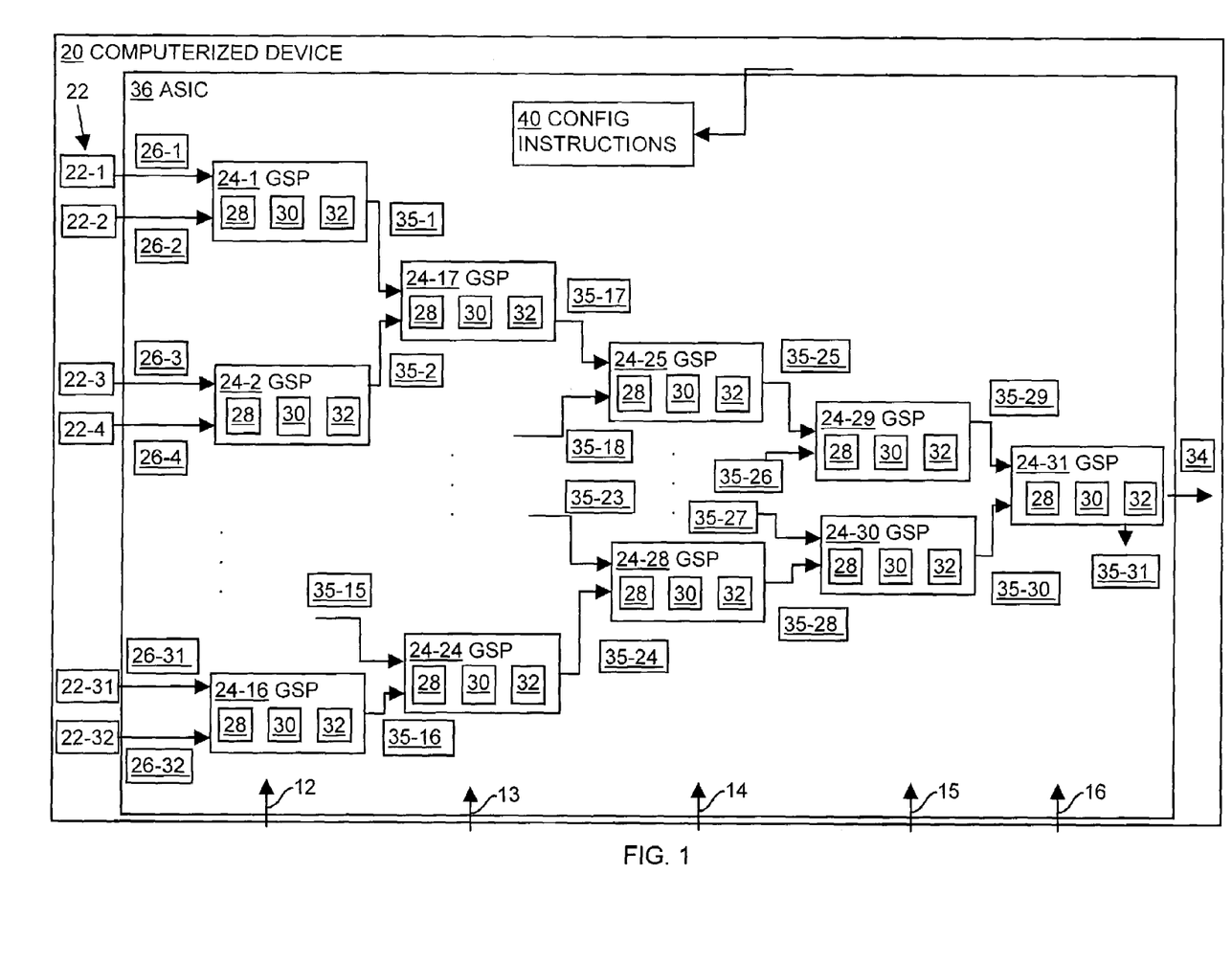
FIG. 1 is a block diagram of a computerized device, configured according to one arrangement.

FIG. 1 illustrates a computerized device 20, according to one embodiment of the invention. The computerized device 20 includes operand sources 22 and a hardware based scheduler, such as an ASIC 36, having generic sorting processors (GSP) 24.

The computerized device 20, for example, is an individual computing device or electronic device such as a router, switch, appliance, server, desktop computer (e.g., personal computer), data communications device, or laptop computer. The operand sources 22, in one arrangement, are queues that receive packets, or traffic, from the computerized device 20 (e.g., the computerized device 20 receives the packets from an external source and assigns particular packets to particular queues 22). In one arrangement, the computerized device 20 is configured with thirty-two separate operand sources 22.

The operand sources 22 have associated operands 26. The computerized device 20 uses the operands 26 to select a preferred operand source 22 from multiple operand sources 22 associated with the computerized device 20. The operands 26, in one arrangement, are unique identifiers for each operand source 22 and are formed of a series of bits or bit values.

The ASIC 36 of the computerized device 20 is configured to schedule, or select, one of the thirty-two operand sources 22 for operation or for transmission of a packet (e.g., data traffic) to a receiver device. Such a hardware-based scheduling implementation of the operand sources 22 provides relatively high-speed selection of a particular operand source 22 for operation.

In one arrangement, when a user configures the ASIC 36, the user transmits configuration instructions 40 to the ASIC 36 to configure a lookup table 44 associated with the ASIC 36. The instructions (e.g., configuration instructions) 40 provide flexibility to the sorting or scheduling process performed by the generic sorting processor 24-1. For example, in a situation where a particular scheduling algorithms or set of configuration instructions 40 requires a modification to improve performance of the computerized device 20, a user transmits updated instructions 40 to the generic sorting processor 24-1 to reconfigure the lookup table 44 with revised decision instructions 82. Such updated instructions 40 modifies how the computerized device 20 schedules or selects a preferred operand source 34 of the operand sources 22 without requiring the user to replace hardware, such as the ASIC 36, in the computerized device 20. Such alteration provides user control of the configuration of the lookup table 44.

The ASIC 36 includes gates or switches, such as generic sorting processors 24. The generic sorting processors 24 are configured with instructions 40, such as sorting or scheduling algorithms. The instructions 40 (e.g., configuration instructions) are changeable and thereby allow modification or upgrading of the sorting or scheduling algorithms utilized by the computerized device 20. Such changeability or flexibility allows a user to revise selection criteria for particular operand sources 22 associated with the computerized device 20.

In one arrangement, the ASIC 36 is configured with thirty-one distinct, and hierarchically arranged, generic sorting processors 24-1 through 24-31 to provide a pipelined sorting of the thirty-two operand sources 22. Each generic sorting processor 24 is configured to select a preferred operand source 34 from two competing operand sources 22. Collectively, therefore, the thirty-one generic sorting processors 24 select a single preferred operand source 34 from the thirty-two available operand sources 22 (e.g., provides a thirty-two to one reduction in the number of operand sources 22 available for operation).

As shown in FIG. 1, the generic sorting processors 24 are configured in five levels, including a first level 12, a second level 13, a third level 14, a fourth level 15, and a fifth level 16. The first level 12 has sixteen generic sorting processors, 24-1 through 24-16. In the first level 12, each generic sorting processor selects, from two competing operand sources, a single operand source 22 for operation, thereby reducing the number of operand sources from thirty-two to sixteen. The second level 13 has eight generic sorting processors 24-17 through 24-24. In the second level, each generic sorting processors selects, from two competing operand sources, a single operand source 22 for operation, thereby reducing the number of operand sources 22 from sixteen to eight. The third level 14 has four generic sorting processors, 24-25 through 24-28, the fourth level 15 has two generic sorting processors, 24-29 and 24-30, and the fifth level 16 has a single generic sorting processor 24-31. The third level 14, fourth level 15, and fifth level 16 of generic sorting processors 24 collectively reduce the number of potential operand sources 22 eligible for operation from eight operand sources 22 to a single, preferred operand source 34. The computerized device 20 selects the preferred operand source 34, such as a preferred queue 34, as an operational queue and allows the preferred queue 34 to transmit a packet to a receiver or receiving device.

Each generic sorting processor 24 includes an extractor element 28, a comparator element 30, and a selector element 32. Such elements 28, 30, 32 of the generic sorting processor 24, as described below, allows the generic sorting processor 24 to select a preferred operand source 34 from between two "competing" operand sources 22.

Figure 2:
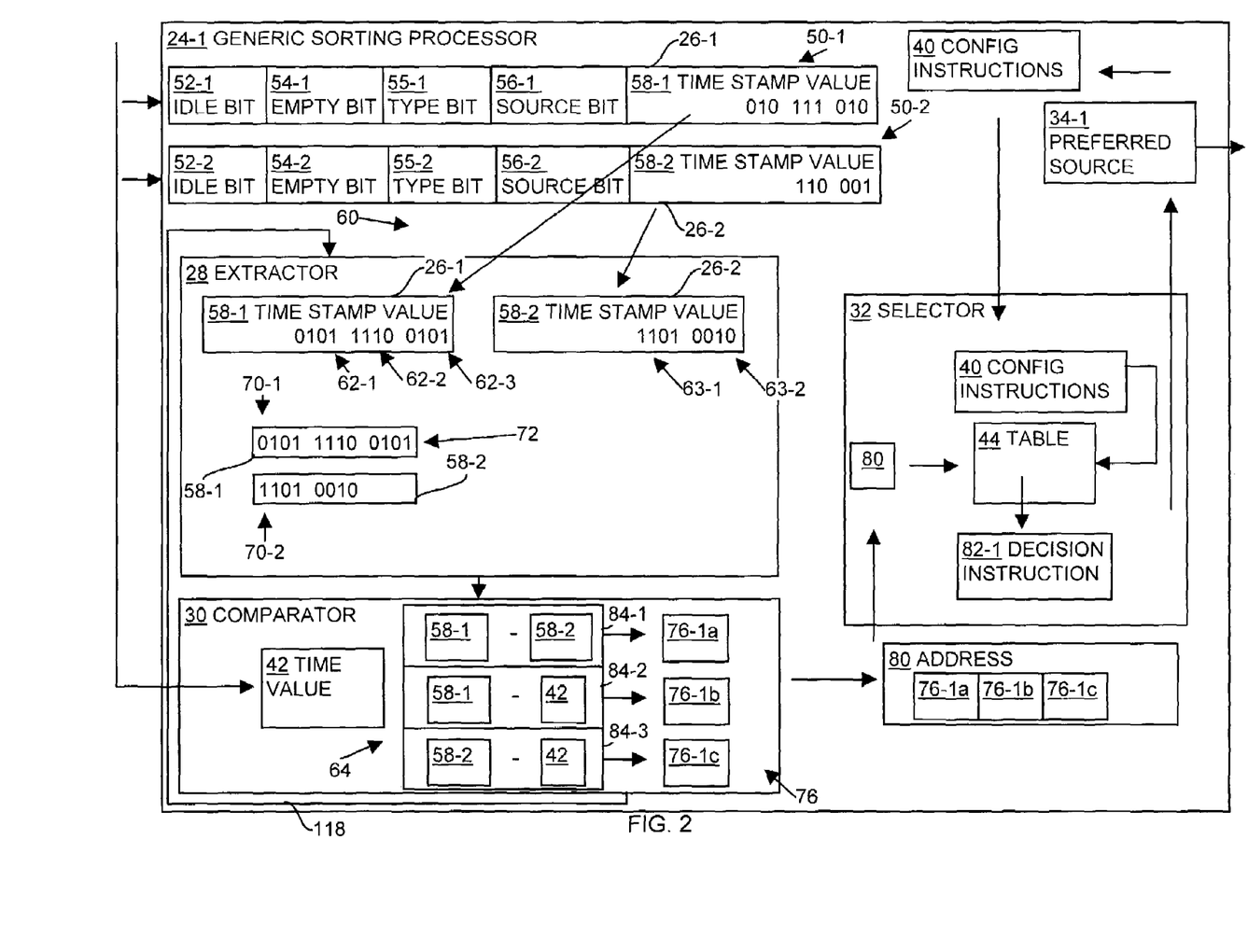
FIG. 2 is a block diagram of a generic sorting processor of the computerized device of FIG. 1, configured according to one arrangement.

FIG. 2 shows an arrangement of the generic sorting processor 24-1 having the extractor 28, comparator 30, and selector 32. Each element 28, 30, 32 of the generic sorting processor 24-1 operates in a pipelined manner to provide a relatively fast processing selection of a preferred operand source 34 from two competing operand sources 22, thereby enhancing performance of the computerized device 20.

Each operand source 22 has an associated operand 26 that identifies the operand source 22. The generic sorting processor 24-1 uses the operands 26-1, 26-2 from two competing operand sources 22-1, 22-2 as the basis for selection of a preferred operand source 34. The extractor 28, in one arrangement, is configured to select, or extract, specific information, such as the operands 26-1, 26-2, from identification information associated with corresponding operand sources 22-1, 22-2. The comparator 30, of the generic sorting processor 24-1, is configured to compare the two operands 26-1, 26-2, from the two operand sources 22-1, 22-2 to produce a comparison result 76. In one arrangement, the comparator 30 is a math processor, such as a subtractor. The selector 32, of the generic sorting processor 24-1, is configured to select a preferred operand source 34 for operation (e.g., select between the first operand source 22-1 and the second operand source 22-2) based upon the comparison result 76.

Figure 3:
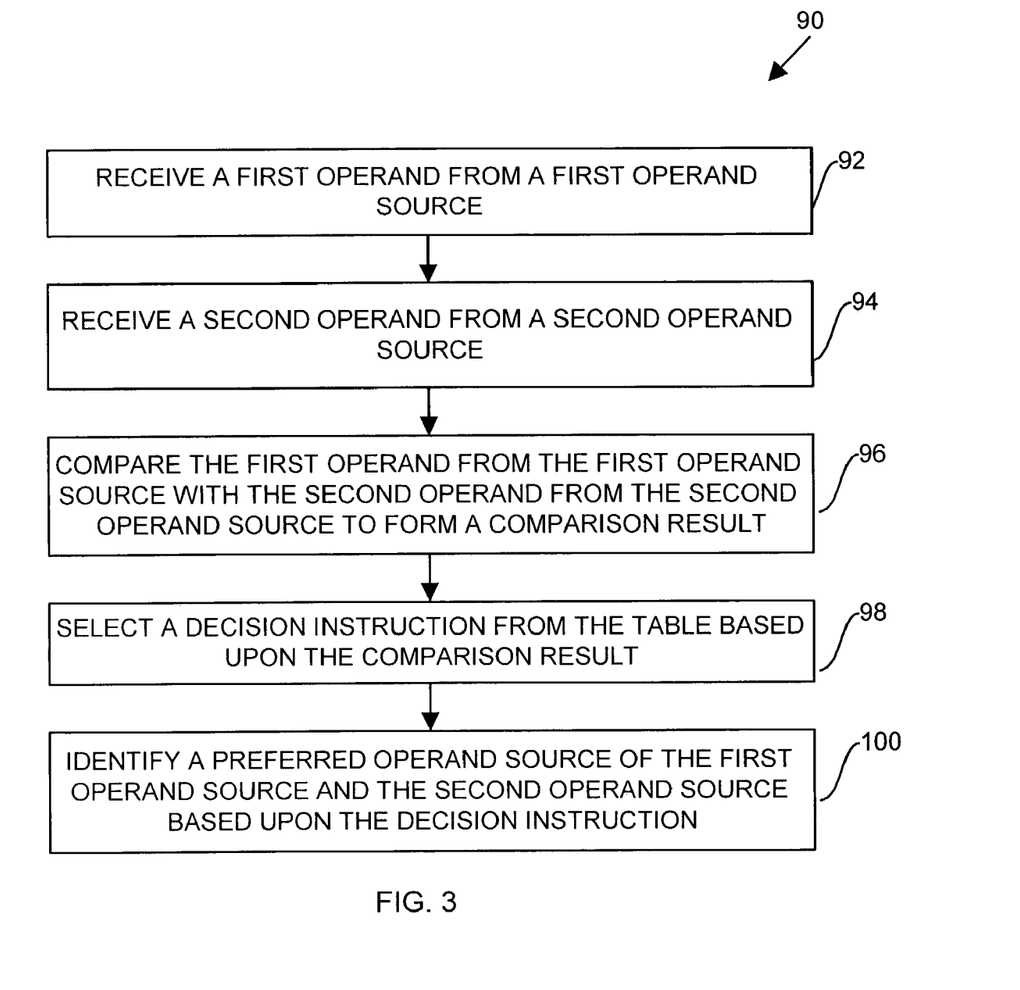
FIG. 3 is a flowchart of a procedure performed by the computerized device of FIG. 1, configured according to one arrangement.

FIG. 3 illustrates a flowchart showing a method 90 performed by the computerized device 20, according to one embodiment of the invention. The method 90 allows the computerized device 20 to select a preferred operand source 34 from a first operand source 22-1 and a second operand source 22-2. The computerized device 20 performs such a selection based upon a software configuration (e.g., scheduling algorithm) of the computerized device 20, thereby allowing a user to change or modify the configuration instructions or scheduling algorithms 40. Furthermore, the computerized device 20 utilizes a hardware implementation of the instructions, thereby providing a relatively fast operand source selection (e.g., providing a relatively fast thirty-two to one reduction of the queues 22 available for operation).

In step 92, the computerized device 20 receives a first operand 26-1 from a first operand source 22-1 (e.g., first queue). In one arrangement, the first operand 26-1 includes a series of bits that identifies the first operand 26-1 as originating from the first operand source 22-1.

In step 94, the computerized device 20 receives a second operand 26-2 from a second operand source 22-2 (e.g., second queue). In one arrangement, the second operand 26-1 includes a series of bits that identifies the second operand 26-2 as originating from the second operand source 22-2.

In step 96, the computerized device 20 compares the first operand 26-1 from the first operand source 22-1 with the second operand 26-2 from the second operand source 22-2 to form a comparison result 76. In one arrangement, the generic sorting processor 24-1 uses the comparator 30 (e.g., subtraction processor) to perform such a comparison. For example, the comparator 30 compares the first operand 26-1 and the second operand 26-2 using a subtraction process. In one arrangement the comparator 30 subtracts the first operand 26-1 from the second operand 26-2 to produce the comparison result 76. In another arrangement, the comparator 30 subtracts the second operand 26-2 to the first operand 26-1 to produce the comparison result 76.

In step 98, the computerized device selects a decision instruction 82 from the lookup table 44 based upon the comparison result 76. In one arrangement, the generic sorting processor 24-1 forms an address 80 based upon the comparison result 76 where the address 80 corresponds to a particular decision instruction 82 within the lookup table 44. For example, assume that the subtraction process performed by the comparator 30 (e.g., four configurable comparators) produces a 4-bit comparison result 76 "1000". The generic sorting processor 24-1 forms the address 80 using the 4-bit comparison result 76 "1000", at least, as part of the address 80. The address 80 corresponds to a decision instruction 82 in the lookup table 44. In one arrangement, the selector 32 receives the address 80 and, based upon the address 80, performs a lookup within the lookup table 44 based on the address 80 to detect the preferred operand source 34 of the first operand source 22-1 and the second operand source 22-2.

In step 100, the computerized device 20 identifies a preferred operand source 34 of the first operand source 22-1 and the second operand source 22-2 based upon the decision instruction 82. For example, in one arrangement, the comparison result 76 is formed from separate comparison results 76-1a, 76-1b, 76-1c, described in detail below. In such an arrangement, the decision instruction 82 indicates to the computerized device 20 how to combine the comparison results 76-1a, 76-1b, 76-1c to select a preferred operand source 34 from either the first operand source 22-1 or the second operand source 22-2. The computerized device 20 selects, such as by using a multiplexor, a preferred operand source 34 of the first operand source 22-1 or the second operand source 22-2, based upon the decision instruction 82.

After the computerized device 20 selects the preferred operand source 34, in one arrangement, the computerized device 20 causes the generic sorting processor 24 to transmit preferred source information 35, associated with the preferred source 34, to a generic sorting processor 24 located in a subsequent, higher level. In one arrangement, the preferred source information 35 includes the operand 26 of the "winning" or preferred operand source 22. The generic sorting processors 24 transmit the preferred source information 35 to subsequently higher levels within the generic sorting processor hierarchy. For example, as shown in FIG. 1, the generic sorting processor 24-1 in level one 12 transmits the preferred source information 35-1 to the generic sorting processor 24-17 in level two 13.

In one arrangement, such as shown by generic sorting processor 24-31 in FIG. 1, after the hierarchy of generic sorting processors 24 select or a single preferred operand source 34, the generic sorting processor 24-31 in the fifth level 16 of the hierarchy transmits the preferred operand source 34 (e.g., decision instruction indicating instructions for selecting the preferred operand source 34) to the computerized device 20, thereby allowing the computerized device to select the preferred operand source 34 to operate or transmit a packet to a receiver. Once the preferred operand source 34 operates, the preferred operand source 34 becomes eligible for scheduling in the next scheduling operation performed by the computerized device (e.g., the preferred operand source 34 becomes eligible for subsequent scheduling and returns to the pool of thirty-two operand sources 22 for a subsequent selection process).

In one arrangement of the computerized device 20, the generic sorting processor 24 uses time stamp information or time stamp values 58 associated with each operand source 22 to select a preferred operand source 34.

As described above, the generic sorting processor 24-1 receives a first operand 26-1 from the first operand source 22-1 and receives a second operand 26-2 from the second operand source 22-2. In one arrangement, the first operand 26-1 and the second operand 26-2 form part of respective keys, 50-1, 50-2, received from the respective operand sources 22-1, 22-2.

In one arrangement, each key 50 is formed of a 32-bit series having an idle bit 52, an empty bit 54, four type bits 55, a source identifier 56, and the operand 26. The idle bit 52 is a single bit indicating the activity of a particular operand source 22 (e.g., activity of the queue over a relatively small duration of time). The empty bit 54 is a single bit that indicates the operand source 22 as not having stored a packet for certain amount of time (e.g., the queue is empty or experiences no activity for a relatively long period of time). The four type bits 55 are a 4-bit series indicating the type of operand source 22 transmitting the key 50. For example, the type bits 55 indicate the operand source 22 as being a virtual time queue, a real-time queue, or a priority queue. The source identifier 56, such as a 32-bit series, is a pointer to a queue identifier, for example, identifying a particular queue associated with a given operand source 22. The operand 26, in this arrangement, is a 26-bit time stamp value 58. The time stamp value 58 relates to real-time clock or counter information and allows the computerized device 20 to detect an amount of elapsed time between operation periods of an operand source 22 (e.g., a queue associated with an operand source 22, for example).

When the generic sorting processor 24-1 receives the first key 50-1 having the first time stamp value 58-1 and receives the second key 50-2 having a second time stamp value 58-2 the generic sorting processor 24-1 uses the extractor 28 in the process of scheduling operation of an operand source 22. In such a case, the extractor 28 extracts or selects 60 the first time stamp value 58-1 from the first key 50-1 and extracts or selects the second time stamp value 58 from the second key 50-2.

In one arrangement, each time stamp value 58-1, 58-2 represents a time stamp having distinct data flow or bandwidth units. For example, assume the time stamp value 58-1 represents a value having the units "microseconds." Also assume the time stamp value 58-2 represents a value having the units "milliseconds." In such an example, the extractor 28 aligns 72 a first relevant bit (e.g., a first relevant high bit) 70-1 of the first time stamp value 58-1 with a first relevant bit (e.g., a first relevant high bit) 70-2 of the second time stamp value 58-2. Such alignment normalizes the time stamp values 58-1, 58-2, and allowing the comparator 30 to compare time stamp values 58 in a consistent manner in order to provide proper scheduling of operation of two distinct operand sources 22-1, 22-2.

For example, as shown in the FIG. 2, the first time stamp value 58-1 includes the bit series "010111100101" and the second time stamp value 58-2 includes the bit series "11010010". During the aligning procedure in this example 72, the extractor 28 left justifies the time stamp values 58-1, 58-2 such that the first relevant bit 70-1 of the first time stamp value 58-1 (e.g. the first bit or the "0" bit) aligns with the first relevant bit 70-2 of the second time stamp value 58-2 (e.g., the first bit or the "1" bit). Therefore, when the extractor 28 passes the aligned time stamp values 58-1, 58-2 to the comparator 30, the comparator 30 compares the first relevant bit 70-1 of the first time stamp value 58-1 with the first relevant bit 70-2 of the second time stamp value 58-2. As described, such alignment normalizes the respective time stamp values 50-1, 50-2. Furthermore such alignment 72 minimizes the effect of "wraparound" or wrapping values created during the subtraction procedures 98 performed by the comparator 30 on the time stamp values 58-1, 50-2.

In one arrangement, the generic sorting processor 24-1 uses a current time value 42 in the comparison process performed by the comparator 30. For example, the current time value 42 represents the real-time (e.g., clock time) associated with the computerized device 20. Typically, computerized devices 20 perform certain sorting processes on associated queues based upon the type of queue being sorted (e.g., a high-priority queue or a high-bandwidth queue). For example, conventional computerized devices 20 sort high priority queues based upon a preset priority assigned to such queues based upon a particular metric (e.g., such as quality of service). In another example, conventional computerized devices 20 sort high-bandwidth queues in real time, thereby requiring the use of the current time value 42 in the comparison process.

As illustrated in FIG. 2, the comparator 30 of the generic sorting processor 24-1 receives the current time value 42 from the computerized device, for example. In one arrangement, the comparator 30 includes three subtractors 84-1, 84-2, 84-3. The three subtractors 84-1, 84-2, 84-3 act in parallel such that each subtractor 84-1, 84-2, 84-3 performs one of three comparisons among the first time stamp value 58-1, the second time stamp value 58-2, and the current time value 42. For example, the first subtractor 84-1 subtracts one of the first time stamp value 58-1 and the second time stamp value 58-2 from the other of the first time stamp value 58-1 and the second time stamp value 58-2 to form a first comparison result 76-1a. The second subtractor 84-2 subtracts one of the first time stamp value 58-1 and the current time value 42 from the other of the first time stamp value 58-1 and the current time value 42 to form a second comparison result 76-1b. The third subtractor 84-3 subtracts one of the second time stamp value 50-2 and the current time value 42 from the other of the second time stamp value 58-2 and the current time value 42 to form a third comparison result 76-1c. The concurrent operation of the subtractors 84 improves operation speed within the computerized device 20 for relatively faster sorting.

The generic sorting processor 24-1, in one arrangement, uses the comparison results 76-1a, 76-1b, 76-1c, to form an address 80 (e.g., create a pointer) that identifies the decision instruction 82 within the lookup table 44. The decision instruction 82, in turn, indicates to the generic sorting processor 24-1 how to combine the comparison results 76-1a, 76-1b, 76-1c to select a preferred operand source 34 from either the first operand source 22-1 or the second operand source 22-2. In one arrangement, each of the comparison results 76-1a, 76-1b, 76-1c includes the most significant bit (e.g., the first bit) of each comparison 64. For example, the address 80 is formed of the three comparison result bits 76-1a, 76-1b, 76-1c. In another arrangement, the address 80 includes the idle bits 52-1, 52-2 of each respective key, the empty bits 54-1, 54-2 of each respective key 50-1, 50-2, the source bits 56-1, 56-2 from each respective key 50-1, 50-2, and the address of each operand source 22-1, 22-2.

As described with respect to FIG. 2, the extractor 28 retrieves or extracts 60 information from the keys 50-1, 50-2 associated with respective operand sources 22-1, 22-2. Also as described, in one arrangement, such information is a time stamp value 58-1, 58-2 for the respective operand source 22-1, 22-2. In one arrangement, the time stamp value 58 is configured with multiple, separate time stamp value fields 62. For example, as shown in FIG. 2, the first time stamp value 58-1 has a first field 62-1, a second field 62-2, and a third field 62-3 and the second time stamp value 58-2 has a first field 63-1 and a second field 63-2.

In one arrangement, the extractor 28 extracts information time stamp value 58 from each key 50-1, 50-2 on a field-by-field basis (e.g., one field 62 at a time). In order to compare all fields 62 between the time stamp values 50-1, 50-2 of the respective keys 50-1, 50-2, the generic sorting processor 24-1 repeats 118 the extraction 60 and comparison 64 processes for each field 62, 63 of the time stamp values 58-1, 58-2.

Figure 4:
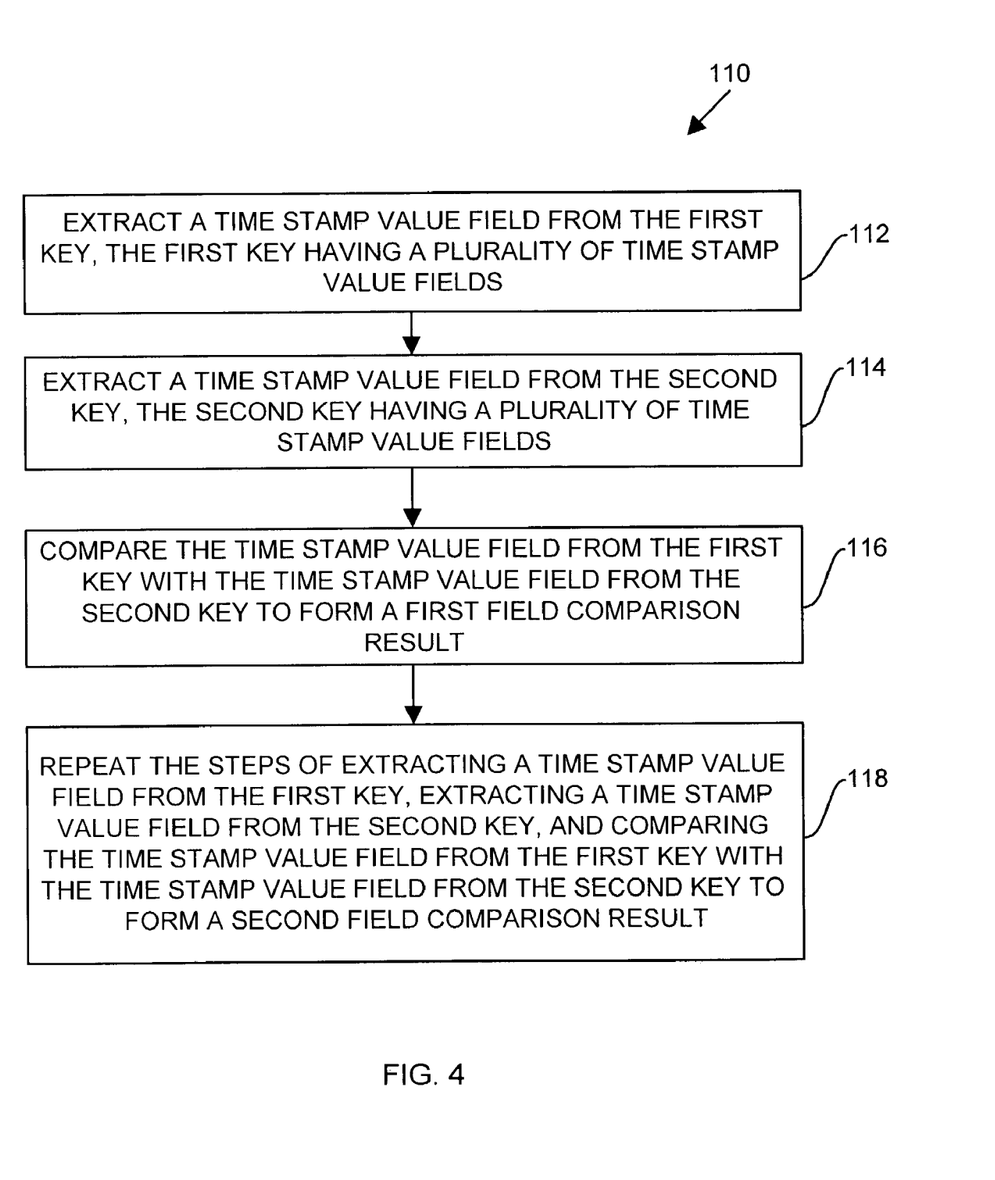
FIG. 4 is a flowchart of a procedure performed by the computerized device of FIG. 1, configured according to one arrangement.

FIG. 4 illustrates a flowchart showing a method 110 performed within the computerized device 20, according to one embodiment of the invention. In the method, the computerized device 20 repeats the extraction 60 and comparison 64 steps for each field 62, 63 within the respective time stamp values 58-1, 58-2.

In step 112, the computerized device 20 extracts a time stamp value field 62-1 from the first key 50-1 where the first key 50-11 has multiple time stamp value fields 62. In one arrangement, the extractor 28 performs such an extraction after aligning the most significant bit 70-1 of the first time stamp value 58-1 with the most significant bit 70-2 of the second time stamp value 58-2.

In step 114, the computerized device 20 extracts a time stamp value field 63-1 from the second key 50-2, where the second key 50 has multiple time stamp value fields 63. For example, the extractor 28 of the generic sorting processor 24-1 performs such an extraction.

In step 116, the computerized device 20 compares 64 the time stamp value field 62-1 from the first key 50-1 with the time stamp value field 63-1 from the second key 50-2 to form a first field comparison result. For example, the computerized device 20 utilizes the comparator 30 of the generic sorting processor 24-1 to compare the time stamp value fields 62-1, 63-1. In one arrangement, the comparator 30 subtracts the time stamp value field 63-1 from the second key 50-2 from the time stamp value field 62-1 from the first key 50-1 to form the first field comparison result.

In step 118, the computerized device 20 repeats 18 the steps of extracting a time stamp value field 62 from the first key 50-1, extracting a time stamp value field 63 from the second key 50-2, and comparing the time stamp value field 62 from the first key 50-1 with the time stamp value field 63 from the second key 50-2 to form a second field comparison result. By repeating the steps of extracting 60 and comparing 64, the computerized device 20 allows the generic sorting processor 24 to compare all fields 62, 63 associated with the time stamp values 58-1, 58-2 thereby accommodating limitations in the maximum number of bits compared by the comparator 30 during a single comparison process.

Figure 5:
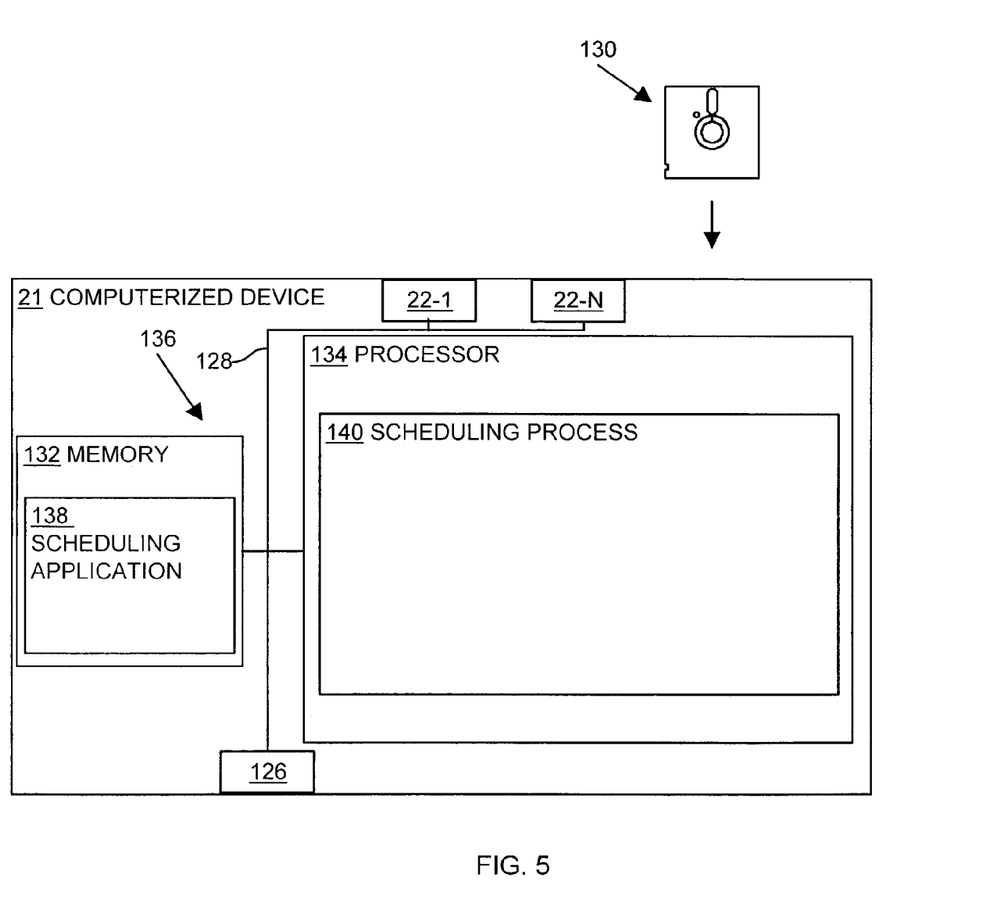
FIG. 5 is a block diagram of a computerized device, configured according to one arrangement.

FIG. 5 illustrates a more detailed architecture of a computerized device 20 configured according to one embodiment of the invention. In situations where a user or device does not require high-speed sorting, a processor can execute the above-described scheduling process. For example, the processor can execute the scheduling process to schedule tasks in an operating system (e.g., the processor acts as an operating system scheduler). By implementing the scheduling process in a processor, a manufacturer reduces the cost of goods sold for a device utilizing the process by eliminating the necessity for use of an ASIC in the device (e.g., to provide a high-speed sorting function).

A computer program product 130 includes an application or logic instructions, such as scheduling instructions, that are loaded into the computerized device 20 to configure the computerized device 20 to schedule operation of a preferred operand source 22.

The computerized device 20 in this example embodiment of the invention includes an interconnection mechanism 128 such as a data bus and/or other circuitry that interconnects a controller 136, such as a memory 132 and a processor 134 with one or more operand sources 22-1, 22-N and communications interfaces 126.

The memory 132 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 132 is encoded with logic instructions (e.g., software code) and/or data that form a scheduling application 138 configured according to embodiments of the invention. In other words, the scheduling application 138 represents software code, instructions and/or data that represent or convey the processing logic steps and operations as explained herein and that reside within memory or storage or within any computer readable medium accessible to the computerized device 20.

The processor 134 represents any type of circuitry or processing device such as a central processing unit, microprocessor or application-specific integrated circuit that can access the scheduling application 138 encoded within the memory 132 over the interconnection mechanism 111 in order to execute, run, interpret, operate or otherwise perform the scheduling application 138 logic instructions. Doing so forms the scheduling process 140. In other words, the scheduling process 140 represents one or more portions of the logic instructions of the scheduling application 138 while being executed or otherwise performed on, by, or in the processor 134 within the computerized device 20.

Those skilled in the art will understand that there can be many variations made to the embodiments explained above while still achieving the same objective of those embodiments and the invention in general.

For example, as described above the selector 32 is configured with a lookup table 44. After performing the comparison process between operands 26-1, 26-1 associated with respective operand sources 22-1, 22-2, the comparator 30 forms an address 80 based upon the results 76 of the comparison. As described, the address 80 points to a decision instruction 82-1 in the lookup table 44 where the decision instruction 82-1 identifies a preferred operand source of the first or second operand sources 22-1, 22-2. In another arrangement, the selector 32 is configured with two lookup tables, a first lookup table and a second lookup table. In such an arrangement, based upon the results of the comparison 64 performed by the comparator 30, the address 80 forms a pointer to an entry or location in the first lookup table. The entry, in one arrangement, includes an address that directs the generic sorting processor 24-1 to the second lookup table. The second lookup table is configured with multiple decision instructions 82 where the decision instructions 82 indicate to the computerized device 20 how to utilize the comparison result 76 to select a preferred operand source 34 from either a first operand source 22-1 or a second operand source 22-2.

In another example, as described above, the instructions 40 configure the lookup table 44 with a series of scheduling entries 82 that the computerized device 20 uses to select a preferred operand source 22 from two competing operand sources 22. In another arrangement, the configuration instructions 40 also configure the arrangement or order of operands 58 in the subtraction procedure 64 performed by the comparator 30. For example, as shown in FIG. 2, the comparator 30 is configured to subtract the second time stamp value 58-2 from the first time stamp value 58-1. In another arrangement, the instructions 40 configure the comparator 30 to subtract the first time stamp value 58-1 from the second time stamp value 58-2. In an alternate arrangement, the comparator 30 receives configuration instructions regarding the order of operands 58 in the subtraction procedure 64 as part of the time stamp values 58-1, 58-2 received from the extractor 28.

In another example, as described above, the configuration instructions 40 to configure the extractor 28 to shift the time stamp values 58-1, 58-2 in a particular arrangement. For example, as illustrated in FIG. 2, the extractor 28 shifts or aligns the bits of the time stamp values 58-1, 58-2 by aligning the first bit 70-1 of the first time stamp value 58-1 with the first bit 70-2 of the second time stamp value 58-2. In such an arrangement, the extractor left justifies the time stamp values 58-1, 58-2. In another arrangement, the configuration instructions 40 configure the extractor 28 to align the bits of respective time stamp values 58-1, 58-2 according to a different metric or procedure. For example, the instructions 40 can configure the extractor 28 to delete or drop the first four bits of the first time stamp values prior to aligning the first bit 70-1 (e.g. most significant bit) of the first time stamp value 58-1 with the first bit 70-2 of the second time stamp value 58-2.

In another example, as described above with respect to FIG. 2, the comparator 30 has three separate subtractors: a first subtractor 84-1 that compares the first time stamp value 58-1 with the second time stamp value 58-2, a second subtractor 84-2 that compares the first time stamp values 58-1 with the current time value 42, and a third subtractor 84-3 that compares the second time stamp values 58-2 the current time value 42. In another arrangement, the comparator 30 includes a fourth subtractor. The comparator uses such a fourth subtractor as a backup in the event of the failure of one of the first three subtractors.

In another example, as described above, the method for scheduling operation of an operand source relates to scheduling of multiple (e.g., thirty-two) queues. Such description is by way of example only. In another arrangement, the computerized device 20 utilizes the described systems and methods to schedule tasks for multiple processors associated with the computerized device 20.

In another example, as described above, when the generic sorting processor 24 detects a preferred operand source 34, the generic sorting processor 24 transmits preferred source information 35 to a generic sorting processor 24 in a higher level within the generic sorting processor hierarchy. As described, the preferred source information 35 includes the operand 26 (e.g., or time stamp value 58) associated with the preferred operand source 34. In another arrangement, in the case where the generic sorting processor 24 uses the current time value current in the comparison process 64, the generic sorting processor 24 passes the current time value 42 as part of the preferred source information 35 to the subsequent generic sorting processor 24 in the hierarchy. Such an arrangement propagates the current time value 42 throughout the hierarchy during the preferred operand source selection process. In another arrangement, the generic sorting processor 24 transmits the results 76 of the comparison 60 along with the time value current as the preferred source information 35 to a subsequent generic sorting processor 24 in the hierarchy.

As shown in FIG. 1, the computerized device selects a single operand source 22 from thirty-two operand sources using thirty-one generic sorting processors 24 in a pipelined process. In another arrangement, the computerized device 20 performs such a reduction in a non-pipelined process. For example, in such a non-pipelined process, the computerized device (e.g., ASIC) is configured with sixteen generic sorting processors 24. During the selection process, the computerized device 20 loops through (e.g., repeatedly utilizes) the sixteen generic sorting processors 24 five times to perform a thirty-two to one reduction of operand sources, thereby allowing selection of a single, preferred operand source 34 for operation.

In another example, as described above, the ASIC 36 of the computerized device 20 is configured to schedule, or select, one of the thirty-two operand sources 22 for operation. In one arrangement, the ASIC is configured to schedule, or select, one of the thirty-two queues for operation (e.g., the queue having the most preferential operand 26). In such an arrangement, each operand source 22 has a one-to-one correspondence with a particular queue of the computerized device. Correspondence between each operand source 22 and each queue, for example, is formed by either direct address mapping between the operand 26 and a queue identifier or via a pointer (e.g., source identifier 56) to a queue identifier. The GSP's 24-1 through 24-31, therefore, simultaneously select the preferred source information 35-31 and maintain the preferred operand source 34 from which the preferred source information 35-31 was obtained. The computerized device 20 then addresses a queue relating to the preferred operand source 34 by referencing an isomorphically arranged pointer memory or by using the source identifier 56 of the preferred operand source 34, for example.

In another example, as described above, the ASIC 36 of the computerized device 20 is configured to schedule, or select, one of the thirty-two operand sources 22 for operation or for transmission of a packet (e.g., data traffic) to a receiver device, thereby providing a 32-to-1 reduction of operand sources 22. The ASIC 36 has generic sorting processors 24 configured in five levels (e.g., a first level 12, a second level 13, a third level 14, a fourth level 15, and a fifth level 16) that provide the 32-to-1 reduction of operand sources 22 in a single reduction round. In one arrangement, the ASIC is configured to provide a 32,000-to-1 reduction of operand sources 22 in three reduction rounds, each reduction round having five levels of generic sorting processors 24. In the first reduction round, the ASIC 36 provides a 32,000-to-1024 reduction of operand sources 22. In the second reduction round, the ASIC 36 provides a 1024-to-32 reduction of operand sources 22. In the third reduction round, the ASIC 36 provides a 32-to-1 reduction of operand sources 22.

In another example, as shown in FIG. 3, in step 92, the computerized device 20 receives a first operand 26-1 from a first operand source 22-1 and in step 94, the computerized device 20 receives a second operand 26-2 from a second operand source 22-2. Such description is by way of example only. In one arrangement, the computerized device 20 receives the second operand 26-2 from the second operand source 22-2 at substantially the same time (e.g., in parallel) as the computerized device 20 receives the first operand 26-1 from the first operand source 22-1.

In another example, as shown in FIG. 4, in step 112, the computerized device 20 extracts a time stamp value field 62-1 from the first key 50-1 and in step 114, the computerized device 20 extracts a time stamp value field 63-1 from the second key 50-2. Such description is by way of example only. In one arrangement, the computerized device 20 extracts the time stamp value field 62-1 from the first key 50-1 at substantially the same time (e.g., in parallel) as the computerized device 20 extracts the time stamp value field 63-1 from the second key 50-2.

Such variations are intended to be covered by the scope of this invention. As such, the foregoing description of embodiments of the invention is not intended to be limiting. Rather, any limitations to the invention are presented in the following claims.

What is claimed is:

1. In a computerized device configured with a lookup table having a plurality of decision instructions, a method for scheduling operation of a preferred operand source comprising the steps of:
   receiving a first operand from a first operand source;
   receiving a second operand from a second operand source;
   comparing the first operand from the first operand source with the second operand from the second operand source to form a comparison result;
   selecting a decision instruction from the table based upon the comparison result; and
   identifying a preferred operand source of the first operand source and the second operand source based upon the decision instruction;
   wherein:
   the step of receiving a first operand includes the step of extracting a first time stamp value from a first key associated with the first operand source,
   the step of receiving a second operand includes the step of extracting a second time stamp value from a second key associated with the second operand source, and
   the step of comparing includes the step of comparing the first time stamp value with the second time stamp value to form a first comparison result;
   further comprising the step of receiving a current time value and wherein the step of comparing further includes the steps of:
   subtracting one of the first time stamp value and the current time value from the other of the first time stamp value and the current time value to form a second comparison result; and
   subtracting one of the second time stamp value and the current time value from the other of the second time stamp value and the current time value to form a third comparison result;
   further comprising the step of forming an address based upon the first comparison result, the second comparison result, and the third comparison result, the address identifying a decision instruction in the table.

2. The method of claim 1 further comprising, prior to the step of comparing, the step of aligning a first relevant bit of the first operand with a first relevant bit of the second operand.

3. The method of claim 1 wherein the step of comparing includes the step of subtracting one of the first operand and the second operand from the other of the first operand and the second operand.

4. The method of claim 1 further comprising the step of forming an address based upon the comparison result, the address identifying a decision instruction in the table.

5. The method of claim 1 wherein
   the step of extracting a first time stamp value includes the step of extracting a time stamp value field from the first key, the first key having a plurality of time stamp value fields,
   the step of extracting a second time stamp value includes the step of extracting a time stamp value field from the second key, the second key having a plurality of time stamp value fields,
   the step of comparing includes the step of comparing the time stamp value field from the first key with the time stamp value field from the second key to form a first field comparison result,
   the method further comprising the step of repeating the steps of extracting a time stamp value field from the first key, extracting a time stamp value field from the second key, and comparing the time stamp value field from the first key with the time stamp value field from the second key to form a second field comparison result.

6. The method of claim 1 further comprising the step of aligning a first relevant bit of the first time stamp value with a first relevant bit of the second time stamp value.

7. The method of claim 1 wherein:
   receiving the first operand from the first operand source comprises receiving the first operand from the first operand source, the first operand source associated with a first queue of the computerized device;
   receiving the second operand from the second operand source comprises receiving the second operand from the second operand source, the second operand source associated with a second queue of the computerized device; and
   identifying the preferred operand source of the first operand source and the second operand source based upon the decision instruction comprises selecting, as an operational queue, one of the first queue associated with the first operand source and the second queue associated with the second operand source to transmit a packet to a receiver.

8. The method of claim 7 comprising:
   receiving updated decision instructions from a second computerized device, the second computer device external to the computerized device; and
   configuring a preconfigured lookup table according to the updated decision instructions to change the selection of one of the first queue associated with the first operand source and the second queue associated with the second operand source as the operational queue.

9. The method of claim 1, wherein the step of comparing the first time stamp value with the second time stamp value to form the first comparison result includes the step of subtracting one of the first time stamp value and the second time stamp value from the other of the first time stamp value and the second timestamp value to form the first comparison result.

10. A computerized device configured with a lookup table having a plurality of decision instructions comprising:
   at least one communications interface;
   a controller; and
   an interconnection mechanism coupling the at least one communications interface and the controller;
   wherein the controller is configured to:
   receive a first operand from a first operand source;
   receive a second operand from a second operand source;
   compare the first operand from the first operand source with the second operand from the second operand source to form a comparison result;
   select a decision instruction from the table based upon the comparison result; and
   identify a preferred operand source of the first operand source and the second operand source based upon the decision instruction;
   wherein the controller is configured to
   when receiving a first operand, extract a first time stamp value from a first key associated with the first operand source,
   when receiving a second operand, extracting a second time stamp value from a second key associated with the second operand source, and
   when comparing, compare the first time stamp value with the second time stamp value to form a first comparison result;
   wherein the controller is further configured to receive a time value and wherein, when comparing, the controller is further configured to:
   compare the first time stamp value and the time value using a subtraction procedure to form a second comparison result; and
   compare the second time stamp value and the time value using a subtraction procedure to form a third comparison result;
   wherein the controller is further configured to form an address based upon the first comparison result, the second comparison result, and the third comparison result the address identifying a decision instruction in the table.

11. The computerized device of claim 10 wherein the controller is further configured, prior to comparing, to align a first relevant bit of the first operand with a first relevant bit of the second operand.

12. The computerized device of claim 10 wherein the controller is further configured, when comparing, to subtract one of the first operand and the second operand from the other of the first operand and the second operand.

13. The computerized device of claim 10 wherein the controller is further configured to form an address based upon the comparison result, the address identifying a decision instruction in the table.

14. The computerized device of claim 10 wherein the controller is configured to
   when extracting a first time stamp value, extract a time stamp value field from the first key, the first key having a plurality of time stamp value fields,
   when extracting a second time stamp value, extract a time stamp value field from the second key, the second key having a plurality of time stamp value fields,
   when comparing, compare the time stamp value field from the first key with the time stamp value field from the second key to form a first field comparison result,
   the method further comprising the step of repeating the steps of extracting a time stamp value field from the first key, extracting a time stamp value field from the second key, and comparing the time stamp value field from the first key with the time stamp value field from the second key to form a second field comparison result.

15. The computerized device of claim 10 wherein the controller is further configured to align a first relevant bit of the first time stamp value with a first relevant bit of the second time stamp value.

16. The computerized device of claim 10 wherein the controller is packaged as an Application Specific Integrated having a generic sorting processor.

17. A computer program product having a computer-readable medium including computer program logic encoded thereon that, when performed on a controller in a computerized device having a coupling to at least one communications interface provides a method for performing the operations of:
   receiving a first operand from a first operand source;
   receiving a second operand from a second operand source;
   comparing the first operand from the first operand source with the second operand from the second operand source to form a comparison result;
   selecting a decision instruction from the table based upon the comparison result; and
   identifying a preferred operand source of the first operand source and the second operand source based upon the decision instruction;
   wherein:
   the step of receiving a first operand includes the step of extracting a first time stamp value from a first key associated with the first operand source,
   the step of receiving a second operand includes the step of extracting a second time stamp value from a second key associated with the second operand source, and
   the step of comparing includes the step of comparing the first time stamp value with the second time stamp value to form a first comparison result;
   further comprising the step of receiving a current time value and wherein the step of comparing further includes the steps of:
   subtracting one of the first time stamp value and the current time value from the other of the first time stamp value and the current time value to form a second comparison result; and
   subtracting one of the second time stamp value and the current time value from the other of the second time stamp value and the current time value to form a third comparison result;
   further comprising the step of forming an address based upon the first comparison result, the second comparison result, and the third comparison result, the address identifying a decision instruction in the table.

18. A computerized device configured with a lookup table having a plurality of decision instructions comprising:
   at least one communications interface;
   a controller; and
   an interconnection mechanism coupling the at least one communications interface and the controller;
   wherein the controller is configured to produce a means for scheduling operation of an operand source, such means including:
   means for receiving a first operand from a first operand source;
   means for receiving a second operand from a second operand source;

means for comparing the first operand from the first operand source with the second operand from the second operand source to form a comparison result;

means for selecting a decision instruction from the table based upon the comparison result; and means for identifying a preferred operand source of the first operand source and the second operand source based upon the decision instruction wherein:

means for receiving a first operand includes means for extracting a first time stamp value from a first key associated with the first operand source, means for receiving a second operand includes means for extracting a second time stamp value from a second key associated with the second operand source, and means for comparing includes means for comparing the first time stamp value with the second time stamp value to form a first comparison result further comprising means for receiving a current time value and wherein means for comparing further includes:

means for subtracting one of the first time stamp value and the current time value from the other of the first time stamp value and the current time value to form a second comparison result; and means for subtracting one of the second time stamp value and the current time value from the other of the second time stamp value and the current time value to form a third comparison result;

further comprising means for forming an address based upon the first comparison result the second comparison result, and the third comparison result, the address identifying a decision instruction in the table.

19. An Application Specific Integrated Circuit comprising a plurality of configurable generic sorting processors, each generic sorting processor having:

an extractor element configured to extract a first operand from a first operand source and a second operand from a second operand source;

a comparator element configured to compare the first operand from the first operand source with the second operand from the second operand source to form a comparison result; and a selector element configured to select a decision instruction from a table based upon the comparison result wherein:

when extracting a first operand from a first operand source and a second operand from a second operand source the extractor element is configured to extract a first time stamp value from a first key associated with the first operand source and extract a second time stamp value from a second key associated with the second operand source, and when comparing, the comparator element is configured to compare the first time stamp value with the second time stamp value to form a first comparison result;

the comparator is configured to receive a current time value and when comparing the first operand from the first operand source with the second operand from the second operand source to form a comparison result, the comparator is configured to subtract one of the first time stamp value and the current time value from the other of the first time stamp value and the current time value to form a second comparison result; and subtract one of the second time stamp value and the current time value from the other of the second time stamp value and the current time value to form a third comparison result;

and form an address based upon the comparison result, the second comparison result, and the third comparison result the address identifying a decision instruction in the table.

* * * * *